United States Patent [19]

Goryachev et al.

[11] 4,112,734
[45] Sep. 12, 1978

[54] DIFFERENTIAL SCANNING MICROCALORIMETER

[76] Inventors: Vladimir Ilich Goryachev, Mikroraion V, 31, kv. 32; Grigory Vladimirovich Kotelnikov, Mikroraion G, 10, kv. 56, both of Puschino Serpukhovskogo raiona, Moskovskoi oblasti; Pavel Semenovich Makurin, Sirenevy bulvar, 62, kv. 213, Moscow, all of U.S.S.R.

[21] Appl. No.: 630,362

[22] Filed: Nov. 10, 1975

[51] Int. Cl.² .......................... G01K 17/00
[52] U.S. Cl. ............................. 73/15 B
[58] Field of Search ............... 73/190 R, 15 B

[56] References Cited

U.S. PATENT DOCUMENTS

| 3,879,983 | 4/1975 | Privalov et al. | 73/15 |
| 3,899,918 | 8/1975 | Privalov et al. | 73/15 |

OTHER PUBLICATIONS

Danforth et al., "Differential Calorimetry of Thermally Induced Processes in Solution," in Rev. of Sci. Instruments, vol. 38, #4, Apr. 1967, 484-487.

Tsong et al., "A Calorimetric Study of Thermally Induced Conformotional Transitions of Ribonuclease Aetc.," in Biochemistry, vol. 9, #13, 1970, pp. 2666-2677.

*Primary Examiner*—Herbert Goldstein
*Attorney, Agent, or Firm*—Lackenbach, Lilling & Siegel

[57] ABSTRACT

A differential scanning microcalorimeter comprising sample and reference calorimetric chambers. The chambers are made as elongated tubes and each is fitted with heater and temperature-sensing elements connected to a power measuring system of controlled thermal processes. In addition, each chamber is provided with an additional temperature-sensing element to separate its sensitive volume which is connected to a sensitive volume separation system. The output of the sensitive volume separation system is connected to an additional heater element placed on tubes external of the chamber sensitive volumes.

5 Claims, 5 Drawing Figures

DIFFERENTIAL SCANNING MICROCALORIMETER

This invention relates to differential thermal analyzers and, more particularly, to differential scanning microcalorimeters.

There is known a differential scanning microcalorimeter (cf. U.S. Pat. No. 3,263,484; filed Aug. 2, 1966) comprising sample and reference holders or chambers fitted with heater and temperature-sensing elements operative to define the temperature of the holders connected to a power measuring system of controlled thermal processes. The heater elements of this microcalorimeter are placed under cup-shaped holder bottoms. Packed up sample and reference materials are placed in these cups. Liquid materials are sealed. The holder capacities do not exceed 0.05–0.1 ml, a further increase being impossible because of the heat supply method used.

Weighing and balancing the sample and reference materials presents quite a problem due to the insufficient capacity of the holders.

Further, the small weight of the sample material (up to 50 mg) and, hence the modest amount of the thermal energy involved in the process make the instrument impracticable for precision measurements of weak thermal effects (such as conformational changes in albuminous solutions and the like).

When a sealed sample material is heated in the course of measurement, the pressure within the sealed holder changes, which is impermissible in calorimetric measurements.

It is, therefore, an object of this invention to provide a differential scanning microcalorimeter with calorimetric chambers having an increased capacity, wherein heat is uniformly applied to the whole sample.

Another object of the invention is to provide a microcalorimeter wherein the sensitive volumes of the calorimetric chambers are automatically separated, the pressure therein being maintained constant in the course of measurement.

Still another object of the invention is to provide a differential scanning microcalorimeter with a higher accuracy of measurement.

These objects are achieved by a differential scanning microcalorimeter comprising sample and reference calorimetric chambers having heater and temperature-sensing elements for determining the temperature of each calorimetric chamber which are connected to a power measuring system of programmed thermal processes. Said calorimetric chambers are, according to the invention, made as elongated tubes fitted with additional temperature-sensing elements for separating sensitive volumes in said chambers and connected to a sensitive volume separation system controlling an additional heater element placed upon tubes external of the sensitive volumes.

It is expedient that the tubes be U-shaped, bent outside the sensitive volumes of the chambers towards one another and secured together at the bend by a heat-conducting material with an additional heater element placed upon this material.

It is also expedient that the additional heater element be placed in such a way as to leave free the part of the heat-conducting material immediately adjacent to the sensitive volumes of the chambers.

Each of the calorimetric chambers may have one of the additional temperature-sensing elements arranged in the middle of its sensitive volume.

The calorimetric chambers of the proposed differential scanning microcalorimeter made as elongated tubes provide a means for uniform heat supply to the entire sample and provide even heating of the tubes. Moreover, since the calorimetric chambers are elongated tubes wherein their sensitive volumes occupy their middle portion only and outlet portions communicate with the atmosphere, the pressure within the chambers can be maintained constant and both sample and reference materials require no sealing. The calorimetric chambers are filled to capacity with the help of an injector through their open ends and the sample sensitive volume is determined by the calorimetric chamber sensitive volume separated automatically from the entire chamber volume by means of additional temperature-sensing elements for chamber sensitive volume separation and connected to a system for separation of sensitive volumes which controls an additional heating element positioned upon the tubes outside the sensitive volumes.

The proposed microcalorimeter exhibits a substantially higher accuracy of measurement of thermal processes under investigation owing to the expanded sensitive volumes of the calorimetric chambers.

The invention will now be described in greater detail with reference to a specific embodiment thereof, taken in conjunction with the accompanying drawings; wherein.

Figure 1:
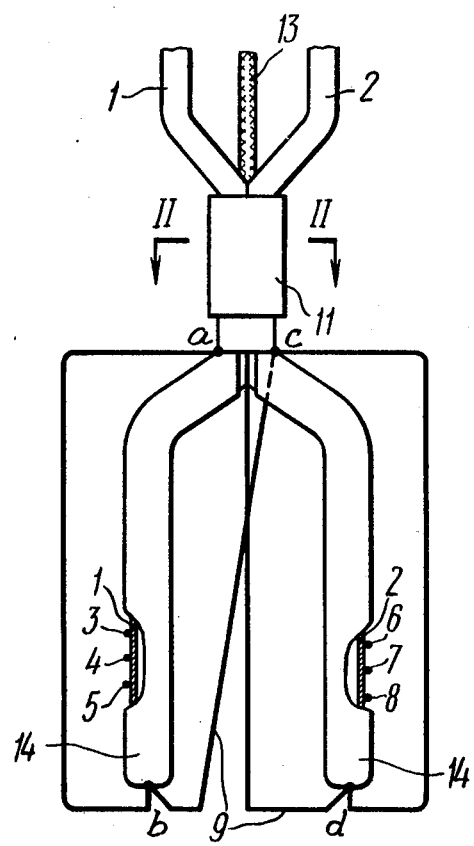
FIG. 1 shows a front view of a calorimetric unit of a differential scanning microcalorimeter, partially broken away, in accordance with the invention.

The calorimetric unit illustrated in FIG. 1 comprises a sample chamber 1 and a reference chamber 2 made as elongated tubes. Heater elements 3 and 4 and a temperature-sensing element 5 are secured upon the surface of the sample chamber 1. Heater elements 6 and 7 and a temperature-sensing element 8 are secured upon the surface of the reference chamber 2.

An additional temperature-sensing element 9 for separation of the sensitive volume of the chambers 1 and 2 is in fact a differential thermobattery with thermocouple junctions $a, b, c, d$. The element 9 may also be any conventional differential temperature sensing device.

Figure 3:
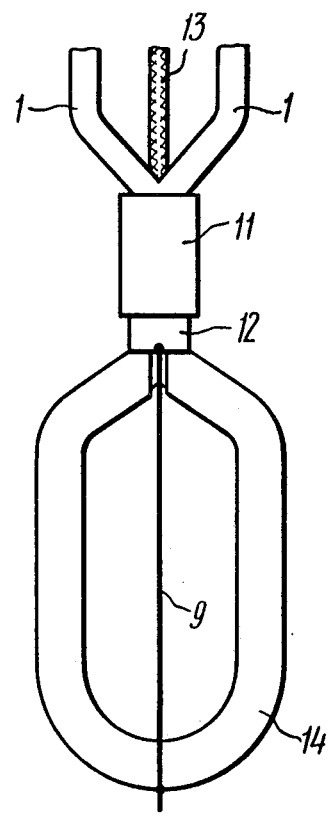
FIG. 3 is a side view of the same calorimeter shown in FIG. 1.
Figure 2:
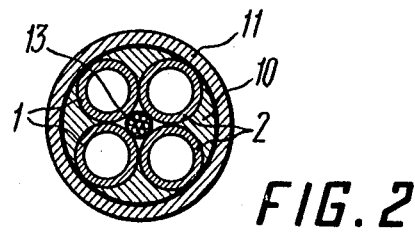
FIG. 2 is an enlarged section view taken along line II—II of FIG. 1.

The tubes are U-shaped, bent outside their sensitive volumes towards one another and secured together at the bend by a heat-conducting material 10 (FIGS. 2 and 3), e.g. by gold if the chambers 1 and 2 are made of gold. The heat-conducting material 10 may be placed only at the portions wherein the two tubes, making up the chambers 1 and 2, are in contact.

An additional heater element 11 is fitted upon the surface of the heat-conducting material 10. A portion 12 of the heat-conducting material surface immediately adjacent to the sensitive volumes of the chambers 1 and 2 is left free of the heater element 11.

The chambers 1 and 2, made as bent elongate tubes, may consist of three sections: ends for securing and filling the chambers; sensitive volumes on which the additional temperature-sensing elements 9 are installed; and a section between the lead-outs and the sensitive volumes in which the tubes are in close proximity to each other and on which the additional heater 11 is disposed.

Lead-outs 13 (FIGS. 1,2,3) of the temperature-sensing and heater elements 3,4,5,6,7,8 and 9 run along the central gap between the tubes secured together by the heat-conducting material 10.

The temperature-sensing and heater elements 3 to 9 are secured upon the surface of the chambers 1 and 2 with the help of an adhesive film 14.

The heater elements 3,4,6,7 and 11 of the proposed embodiment of a microcalorimeter are wire resistors.

The calorimetric chambers 1 and 2 may be made as coiled tubes to enlarge their sensitive volumes.

However, such chambers are considerably harder to fabricate as compared to U-shaped ones.

Figure 4:
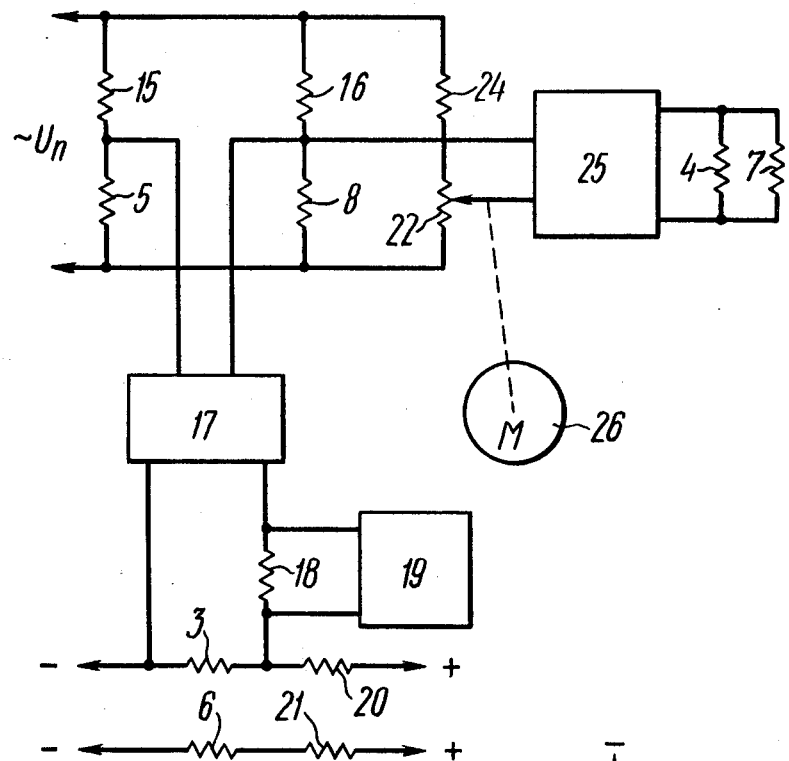
FIG. 4 is an electric circuit diagram of a power measuring system and of a calorimetric chamber heating system of a differential scanning microcalorimeter, in accordance with the invention.

Referring now to FIG. 4, the electric circuit of the microcalorimeter comprises a power measuring system and a programmed chamber heating system.

The power measuring system comrises: a measuring bridge, including resistors 15 and 16 and temperature-sensing elements 5 and 8, which are resistance thermometers in this embodiment, and an AC amplifier 17 connected to the measuring diagonal of the bridge. The output of the amplifier 17 is coupled to the heater element 3 of the sample chamber through a resistor 18 producing an electrical signal when the balancing power current passes therethrough. The resistor 18 is connected to a recorder 19. The series-connected heater 3 and resistor 20 are coupled to a constant voltage source (not shown), the rating of the heater element 3 being well below that of the resistor 20. Similarly, the heater element 6 of the reference chamber and resistor 21 are to meet this condition, the heater element 6 being identical to the heater element 3 both electrically and structurally. The heater element 6 produces electrical power equal to that produced by the heater element 3 with current passing therethrough in the absence of thermal processes in the sample chamber. The heater element 6 is unaffected by the balancing power of the thermal processes in the sample chamber.

The programmed chamber heating system is in fact a measuring bridge including the temperature-sensitive element 8 of the reference chamber, a variable resistor 22 producing a program electrical signal and fixed resistors 16 and 24, the rating of resistor 16 being well above that of the temperature-sensing element 8. The measuring diagonal of this bridge includes an AC amplifier 25 having its output coupled to the paralleled heater elements 4 and 7 of the sample and reference chambers, respectively.

The cursor or sliding contact of the resistor 22 is connected to the shaft of an electric motor 26.

Figure 5:
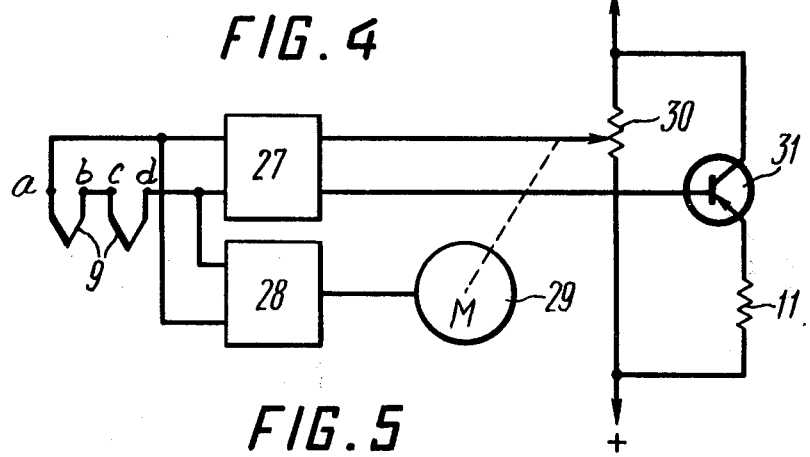
FIG. 5 is an electric circuit diagram of a calorimetric chamber sensitive volume temperature control device of a differential scanning microcalorimeter, in accordance with the invention.

Turning now to FIG. 5, the chamber sensitive volume temperature control device comprises: a temperature sensor whose function is performed by the additional temperature-sensing element 9 and a floating temperature controller including AC amplifiers 27 and 28 with input modulators and output demodulators, their inputs being coupled to the output of the element 9, an electric motor 29 coupled to the output of the amplifier 28, a variable resistor 30, its cursor or sliding contact being electrically connected to the output of the amplifier 27 and mechanically coupled to the shaft of the motor 29, and an electronic power amplifier 31 of an emitter follower, having its output connected to the additional heater element 11. The sensitive volumes of the chambers are automatically separated by controlling the amount of heat from the additional heater 11 by means of the temperature control device in accordance with a signal from the temperature-sensing element 9, thus preventing a heat exchange between the sensitive volumes and the surrounding atmosphere through the lead-outs and ensuring that the temperature along the whole length of the sensitive volumes is constant. Therefore, the sensitive volume of the chambers is that section in which the sample and reference chambers are not in contact with each other and wherein there is no temperature drop along the whole length of the volume, there being no heat exchange between the volume and the surrounding atmosphere through the lead-outs of the tubes.

It is possible to place one additional sensor (the additional temperature-sensing element 9) at the boundary between the common section of both chambers and the sensitive volumes of the chambers and a second additional sensor 9 in the middle portion of the sensitive volume of the chambers.

The microcalorimeter operates as follows.

The sample chamber 1 is filled with the liquid to be studied and the reference chamber 2 is filled with a reference liquid. The chambers 1 and 2 are thereupon either heated or cooled at a preset rate of temperature change. When the liquid under study is thermally neutral, the measuring bridge, consisting of resistors 8, 5, 15, 16 of the power measuring system is balanced, but as soon as any thermal process starts in the liquid under study the balance of the bridge is upset. The bridge unbalance signal is amplified by the amplifier 17 (FIG. 4) and fed to the heater element 3 of the sample chamber, whereupon the temperature changes until the bridge is balanced again. The balancing current is added with the initial current in the heater 3, set by the resistor 20 rating. The resistor 18 produces a voltage proportional to the power applied to equalize the thermal effect. This voltage is registered by the device 19 which is a recorder in this embodiment. Temperature scanning is governed by the programmed chamber heating system.

The temperature scanning program depends on the rotational speed of the motor 26. The movement of the cursor of the resistor 22 unbalances the measuring bridge consisting of resistors 16, 24, 8 and 22, of the programmed chamber heating system. The bridge unbalance signal is fed from the bridge to the amplifier 25 and the amplified signal is applied to the paralleled heater elements 4 and 7 of the sample and reference chambers. The sample and reference chambers are heated before the measuring bridge, consisting of resistors 16, 24, 8 and 22, is electrically balanced. This is the way proper temperature scanning of the calorimetric chambers, controlled by program signals, is achieved.

The calorimetric chamber sensitive volumes are automatically separated by the sensitive volume temperature control device (FIG. 5). The temperature-sensing element 9, some of its junctions $b$, $d$ being in the middle portions of the sensitive volumes of the chambers 1 and 2 (FIG. 1) other junctions $a$ and $c$ being on the sensitive volume boundaries (at the base of the tubes bent portions), supplies signals to the floating temperature controller thus equalizing the temperature of the junctions of the element 9. Any thermal processes in the chambers 1 and 2 outside the tube portions embraced by the temperature-sensing element 9 leave these portions unaffected since they are balanced by the sensitive volume temperature control device in much the same manner as external thermal disturbances due to the heat transfer through the tubes, liquid and lead-outs 13 of the temperature-sensing elements are balanced by heating with the help of the additional heater element 11.

The portion 12 of the heat-conducting material 10 prevents heat transfer to the sensitive volumes of the chambers 1 and 2 from the additional heater element 11, which may affect the sample and reference chambers 1 and 2 in a variety of ways due to manufacturing imperfections of the additional heater element 11.

Thus, the tube portions embraced by the temperature-sensing element 9 are thermally isolated from the remaining portion of the calorimetric chambers 1 and 2 and constitute the sensitive volumes of the calorimetric chambers 1 and 2.

Another embodiment of the invention (not shown) may have a sensitive volume separation system wherein the chambers 1 and 2 are not secured together by the heat-conducting material 10. In this case, each of the chambers 1 and 2 is to be provided with a sensitive volume separation system of its own.

What is claimed is:

1. A differential scanning microcalorimeter comprising: a sample calorimetric chamber made as an elongated tube bent so that both ends of the tube are in close contact with each other over a section disposed between the outlet ends of the tube and a working volume of the sample chamber; a reference calorimetric chamber made as an elongated tube bent so that both ends of the tube are in close contact with each other over a section disposed between the outlet ends of the tubes and a working volume of the reference chamber, said sections of each of said tubes being in close contact with each other; first temperature regulator means for equalizing the temperatures between the chambers by applying additional electric power to heat said sample chamber responsive to a signal indicating a temperature difference between said chambers and for issuing a signal proportional to said additional power to be recorded in recording means, said first temperature regulator means having an input and an output; heater elements, for heating said sample and reference chambers, connected to said output of said first temperature regulator means and disposed on said chambers; temperature-sensing elements, for determining the temperature of each of said chambers, connected to said input of said first temperature regulator means and installed on each of said chambers; means for shaping a program for temperature scanning of said chambers and having an output; second temperature regulator means for program-controlled temperature scanning of said chambers by supplying variable power to said heater elements of said chambers in response to a signal from said means for shaping a program for temperature scanning, said second temperature regulator means having inputs and outputs, said inputs being coupled with said temperature-sensing elements and with said output of said means for shaping a program for temperature scanning, and said outputs being coupled with said heater elements of said chambers; third temperature regulator means serving to separate the working volumes, said third temperature regulator means having an input and an output; additional temperature-sensing elements for separating the working volumes, installed on said working volumes of said chambers and coupled to said input of said third temperature regulator means to supply said third temperature regulator means with a signal indicating a temperature difference over the length of the working volumes of each of said chambers; an additional heater element coupled to said output of said third temperature regulator means and disposed on said section of contact between said chambers beyond said working volumes, said additional heater element serving to reduce to zero the temperature difference over the length of the working volumes by heating them from said third temperature regulator means in response to a signal indicating the temperature difference over the length of the working volumes and supplied from said additional temperature-sensing elements.

2. A differential scanning microcalorimeter as claimed in claim 1, wherein said tubes are generally U-shaped and are secured to each other at said sections by a heat-conducting material; said additional heater element being placed upon said heat-conducting material.

3. A differential scanning microcalorimeter as claimed in claim 2, wherein a portion of said heat-conducting material immediately adjacent to said chambers is left free of said additional heater element.

4. A differential scanning microcalorimeter as claimed in claim 2, wherein an additional temperature-sensing element is accommodated in the middle portion of said sensitive volume of each of said calorimetric chambers and another additional temperature-sensing element is accommodated at the edge of the sensitive volume of each of said chambers.

5. A differential scanning microcalorimeter as claimed in claim 1, wherein an additional temperature-sensing element is accommodated in the middle portion of said sensitive volume of each of said calorimetric chambers and another additional temperature-sensing element is accommodated at the edge of the sensitive volume of each of said chambers.

* * * * *